United States Patent [19]

Giusto

[11] 4,131,761
[45] Dec. 26, 1978

[54] METHOD OF AND MEANS FOR CONVEYING AND RECOVERING SUPPLEMENTARY MESSAGE SIGNALS SUPERIMPOSED UPON A MULTILEVEL SIGNAL STREAM IN A DIGITAL TRANSMISSION SYSTEM

[75] Inventor: Pietro P. Giusto, Turin, Italy

[73] Assignee: CSELT - Centro Studi e Laboratori Telecomunicazioni, Turin, Italy

[21] Appl. No.: 790,071

[22] Filed: Apr. 22, 1977

[30] Foreign Application Priority Data

Apr. 22, 1976 [IT] Italy .................... 67961 A/76

[51] Int. Cl.$^2$ ............................................. H04J 7/00
[52] U.S. Cl. .......................... 179/15 BY; 179/15 RW; 325/38 A
[58] Field of Search ........ 179/15 BY, 15 BD, 15 BM, 179/15 BW; 325/38 A; 178/50

[56] References Cited

U.S. PATENT DOCUMENTS

| | | | |
|---|---|---|---|
| 3,612,770 | 10/1971 | Zegers et al. | 179/15 BY |
| 3,970,798 | 7/1976 | Epenoy et al. | 179/15 BY |
| 4,002,846 | 1/1977 | Barbier | 179/15 BY |

*Primary Examiner*—Douglas W. Olms
*Attorney, Agent, or Firm*—Karl F. Ross

[57] ABSTRACT

A multilevel mainstream of digital signals, organized in a recurrent frame, is monitored at a transmitting end by a pulse generator GP1 which emits a marking pulse whenever that mainstream has a modulable waveform, i.e. a symbol represented by either the lowest or the highest amplitude level. A waveform generator GF controlled by pulse generator GP1 produces a bipolar signal 19 whose pulses are to be superimposed upon the modulable waveforms coinciding with the occurrences of the marking pulses, the superimposition being carried out in an analog adder S1 which extends the amplitude excursion of the mainstream signal beyond its limiting level. The mainstream frame is divided into a plurality of subframes during the first of which the bipolar signal 19 is a frame-alignment word with an invariable first part and a variable second part, the latter specifying the number of clock cycles — corresponding to the number of mainstream symbols — elapsed between the start of the frame and the appearance of the first modulable waveform. In subsequent subframes, the bipolar signal 19 carries message bits from one or more supplementary signal channels. At a receiving end, a threshold circuit CD emits confirmation pulses 24 upon detecting any modulable waveform in the incoming composite signal stream and further emits demodulation pulses 25 if that waveform is amplitude-modulated beyond the normal highest or lowest level. From these two pulse sequences 24, 25 a comparator CF1 determines, during a first subframe, whether the fixed part of an incoming alignment word has a predetermined configuration whereupon a second comparator CF2 checks, with the aid of a counter CL2 stepped by extracted clock pulses and a shift register R2 controlled by that counter, whether the variable second part of that alignment word corresponds to the number of elapsed clock cycles. Upon verification of alignment, counter CL2 is enabled by a logic network LA to allow the readout of demodulation pulses 25 during the following subframes as a replica of the supplementary message bits. Otherwise, logic network LA initiates an alignment search until the requisite synchronism is achieved.

10 Claims, 9 Drawing Figures

METHOD OF AND MEANS FOR CONVEYING AND RECOVERING SUPPLEMENTARY MESSAGE SIGNALS SUPERIMPOSED UPON A MULTILEVEL SIGNAL STREAM IN A DIGITAL TRANSMISSION SYSTEM

FIELD OF THE INVENTION

My present invention relates to digital transmission systems and in particular to means for the addition of supplementary message signals to a main signal stream in a system utilizing multilevel digital transmission, without substantially modifying the organization of the transmission system itself.

BACKGROUND OF THE INVENTION

A basic problem associated with any communication system is that of adding to the main signal stream a given number of supplementary signals which may also have a service function.

In the case of digital transmission systems, the addition of such supplementary signals gives rise to considerable technical problems and is generally very expensive.

The techniques used till now are mainly based on three types of solution:

(a) the addition of separate signal links; (b) frequency multiplexing of the additional signals with the main information signal; and (c) time multiplexing the several types of signal.

Even though the first solution results in a rather simple and reliable system from the technical standpoint, it entails a considerable increase in circuitry costs.

The solution offered by frequency multiplexing among supplementary signals and the main information signal necessarily imposes, as known to the skilled in the art, a restriction in the frequency spectrum assigned to the main signal stream and the use of expensive filters capable of preventing mutual interference between the signals of the main and supplementary streams; in any case this type of solution entails a degradation of the characteristics of the main information signal because of the filtering involved.

Finally, time multiplexing the main and additional signal streams requires an identification of the main-stream frame structure, the introduction of modifications, and the rearrangement of the signals into a new frame structure, which includes also the additional messages.

This type of operation is rather burdensome in terms of costs, in particular in cases where the frame of the main signal stream has been set up in a place different from that in which supplementary signals should be added or extracted.

OBJECTS OF THE INVENTION

An object of my invention is to obviate these and other disadvantages in a data-transmission system which does not require any additional signal links besides the channel carrying the main information signal; does not call for frequency multiplexing of the main and supplementary signals so as to avoid any restriction of the frequency spectrum allotted to the main information stream; does not require filters and does not cause any mutual interference between the signals of the main information stream and those of the supplementary streams; and does not require recognition or rearrangement of the frame of the main signal stream.

Another object of my invention is to allow for the addition or extraction of supplementary message signals at any point of the transmitting or receiving channel carrying the main information signals, regardless of the point where the frame containing the main information signals is organized.

SUMMARY OF THE INVENTION

Pursuant to one aspect of my invention, there is generated at a transmitting end of a digital transmission system a main signal stream consisting of waveforms occurring during consecutive clock cycles, these waveforms carrying information in the form of amplitude variations among a plurality of levels which include two limiting levels (upper and lower) and at least one intermediate level. The main signal stream is monitored to find waveforms, referred to hereinafter as modulable, with amplitudes at one or preferably at either of these limiting levels. Supplementary message symbols from a suitable source are converted into modification pulses coinciding with selected modulable waveforms for modulating the latter by extending their amplitudes beyond the limiting level thereof whereby a composite signal stream is produced for transmission to a receiving end of the system. At that receiving end, the modulated waveforms of the composite signal stream are detected by comparing the amplitudes with one or more predetermined thresholds. This comparison yields, upon detection of modulated waveforms, demodulation pulses from which the supplementary message can then be reconstituted.

Advantageously, pursuant to a more particular feature of my invention, the main signal stream is organized in a recurrent frame divided into a plurality of subframes each of which encompasses a predetermined number of clock cycles. In a first subframe of each frame, a multibit alignment word is transmitted to the exclusion of supplementary message pulses by deriving the modification pulses, used for the modulation of selected waveforms, from the bits of this alignment word. The latter is preferably subdivided into an invariable first part and a variable second part, this second part being based upon the number of clock cycles elapsed from the beginning of a frame to the occurrence of the first modulable waveform in the main signal stream. At the receiving end, proper correlation of the time positions of the several subframes with those established at the transmitting end (on the basis of a predetermined count of clock cycles) can thus be verified by comparing the recovered alignment word with a reference bit combination consisting of a predetermined first part and a variable second part derived from the number of waveforms counted between the beginning of a frame and the appearance of the first modulable waveform in the composite signal stream.

In accordance with another aspect of my invention, the circuitry for implementing the aforedescribed message-conveying method comprises monitoring means connected in a transmitting section of the system to an outgoing channel, carrying the main signal stream, for emitting marking pulses upon the occurrence of modulable waveforms detected in that signal stream. A signal generator, connected to the monitoring means and to a source of supplementary message symbols, derives modification pulses from these symbols in response to the generated marking pulses and feeds them to an analog adder, connected to the outgoing channel, for superimposing these modification pulses upon coincident modulable waveforms. At a receiving section, the amplitude excursions of the waveforms so modulated are detected by threshold means producing the aforementioned demodulation pulses in response thereto.

If both limiting levels are utilized for conveying supplementary message signals, the signal generator in the transmitting section is provided with an additional input connected to the outgoing channel for ascertaining the limiting level which corresponds to the amplitude of a modulable waveform detected in the main signal stream; the modulation pulses emitted by this signal generator then assume a polarity depending upon the limiting level of the modulable waveform coinciding therewith.

Still another feature of my invention resides in the provision of a logic network at the receiving section which, under the control of verification means checking a recovered alignment word as discussed above, seeks to establish a missing correlation of the frame positions of the transmitted and received signal streams by restarting a count of clock cycles in the event of a divergence between a reference bit configuration (including the aforedescribed two parts of an alignment word) and a bit sequence recovered by the threshold means in a first subframe.

BRIEF DESCRIPTION OF THE DRAWING

The above and other features of my invention will now be described in detail with reference to the accompanying drawing in which.

SPECIFIC DESCRIPTION

Figure 1:
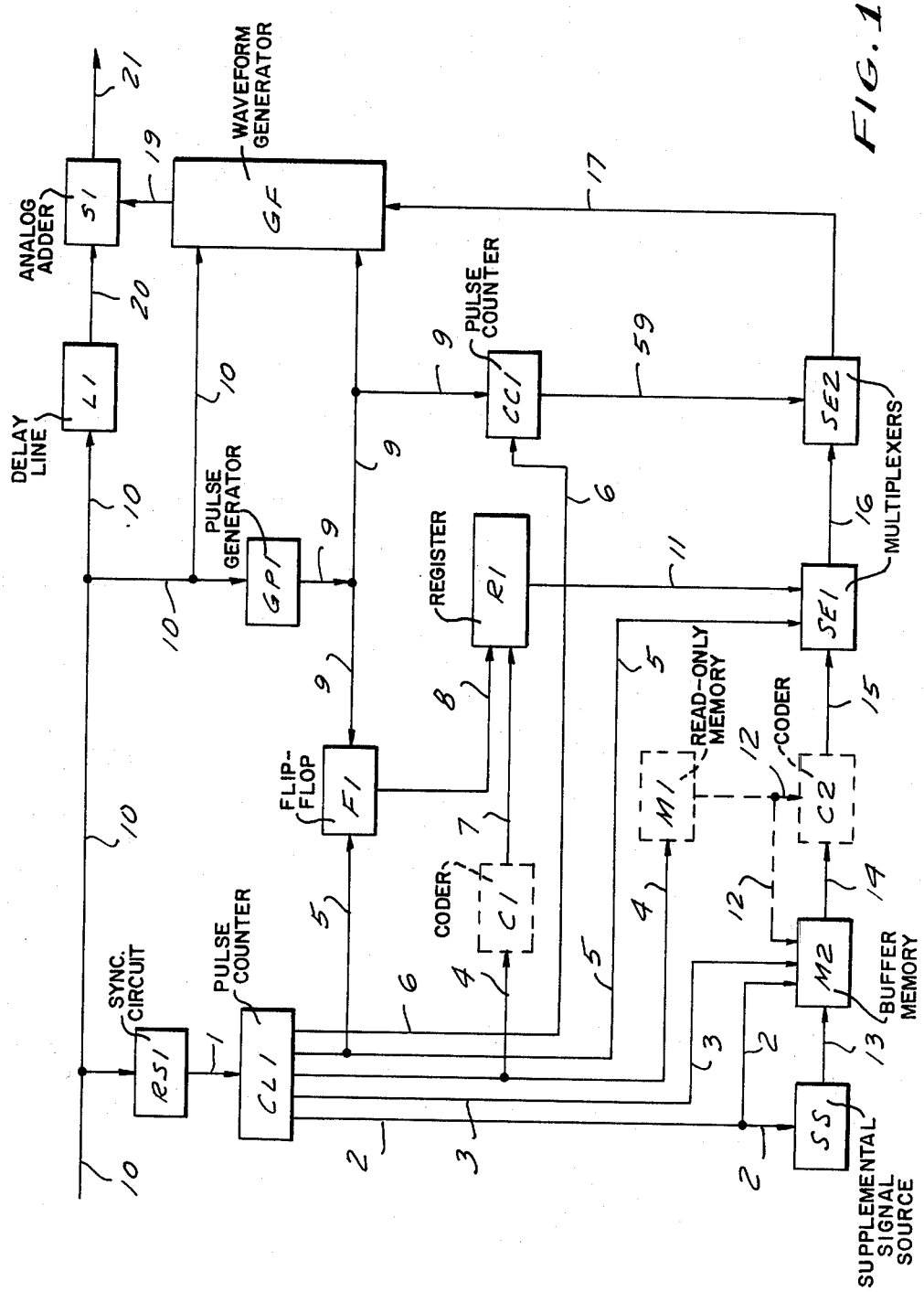
FIG. 1 is a block diagram of the transmitting section of a system embodying my invention.

I shall now briefly describe the basic principles of the invention and, in particular, the simplifications adopted for a better understanding of the embodiment here considered.

In general, the main information signal consists of a series of waveforms, each of them being associated with a given succession of digital symbols having a recurrence period or cycle T.

These waveforms obviously depend upon the kind of modulation adopted for the transmission of the information. Systems operating entirely or in part by the modulation of a carrier amplitude, as well as FM systems, have the advantage of tolerating amplitude increases of the modulating waves beyond the outermost levels considered, without impairing the transmission quality of the information.

It is known that a signal modification extending the amplitude range beyond the normally outermost levels does not involve any variation of the usual threshold adopted for the demodulation, since the waveform exceeding the maximum level is simply read as a signal of a magnitude greater than or equal to the one corresponding to that level.

In order to add further information to the main signal stream, carrying information at a plurality of levels, it is only necessary to establish a relationship among certain variations introduced at the transmitting end into the modulable waveforms and an amplitude rise at the receiving end above various supplementary critical thresholds.

Thus, my invention comprises the addition at the transmitting end of a supplementary modulation range, beyond the normal amplitude range, to be detected at the receiving end, thereby ensuring an undisturbed flow of the mainstream signals which act as a base for the added modulation range.

For convenient introduction into the main flow of information signals, the supplementary message signals must be assigned a cadence related in a rational ratio to that of the mainstream signals; they also must be arranged in a suitable frame containing correlating information which is called hereinafter an "alignment word".

Such alignment word is needed by the receiving section in order to establish the frame-alignment condition which is a prerequisite for detecting the start of each frame.

If $\tau$ is the mean time interval between the transmission of two successive symbols of the supplementary signal stream, which has already been arranged into a frame and therefore includes the alignment word, and with T representing the symbol-recurrence period of the main signal stream, the rational ratio r between the cadences of the two signal streams is given by:

$$r = T/\tau \qquad (1)$$

The upper limit of r is represented by the statistical frequency of occurrence of the modulable waveforms in the main signal stream.

If p is the probability that these waveforms will be present in a time interval T, transmission of the supplementary message signals requires that $$p > r \qquad (2)$$

so as to make sure that, given a reasonably large number of symtols of the main signal stream, there are available as many modulable waveforms as are the symbols of the supplementary signal stream to be transmitted during a given time corresponding to the number of mainstream symbols under consideration.

In practice it is advisable to adopt, for r, reasonably small values with respect to the value of p, since in this way reliable safety margins may be assured.

As the values of p and T are typical characteristics of the main signal stream, it behooves to define a suitable value for r, capable of satisfying relationship (2), compatible with a value of $\tau$ taking into account the required transmission rate for the supplementary message signals.

The frame period of the supplementary signal stream should be equal to a whole number N of symbols of the main signal stream, i.e. equal to NT, with N so chosen that this frame period should cover a whole number k of symbols of duration $\tau$, of the supplementary signal stream, according to the relationship $$N = k\tau/T = k/r \tag{3}$$

In the final analysis, in order to define the desired frame period, it will be sufficient to find a pair of whole numbers (N, k) such that the following relationship may be verified:

$$k/N = r \tag{4}$$

The internal organization of the frame of the supplementary signal stream is based on a subdivision into D subframe intervals each having a duration equal to a whole number of cycles T, which means for instance $n_1T$ for the first, $n_2T$ for the second and $n_DT$ for the last of these subframes.

The sum of the subframe durations must, of course, equal the entire frame period, i.e.

$$\sum_{i=1}^{D} n_1 = NT \tag{5}$$

In the embodiment here described, the first of the D subframes, of duration $n_1T$, has been designed to carry the alignment word consisting of a fixed part followed by a variable part, the latter representing the number of symbols of the main signal stream that have passed from the actual start of the frame period up to the occurrence of the first symbol of the main signal stream corresponding to a modulable waveform.

In the remaining D-1 subframes the symbols pertaining to the supplementary signal stream are transmitted.

The number of symbols $k_i$ (i = 1,2, ... D) associated with each of the subframes is obviously dependent upon the duration $n_iT$ preselected for such subframe.

In this way different information signals can be sent, organized in blocks containing different numbers of symbols. The sum total of the symbols relating to the actual supplementary signal stream which are sent in all the subdivisions of frame period NT is equal to $k_e$, according to the relationship $$\sum_{i=2}^{D} k_1 = k_e \tag{6}$$

The criteria adopted for determining the actual value of the number N, which appears in equation (5), and, consequently, the actual values of k and $k_e$ are the result of a compromise between two opposite requirements: the need for frequently receiving the information relating to the frame alignment so as to establish and control this alignment as rapidly as possible, and the opposite need for reducing the energy expenditure associated with the transmission of the frame-alignment word.

In the particular example described hereinafter, reference is made to a pulse-amplitude-modulation system (PAM) with 4 equally probable and equispaced levels, with provision made for the additional modulation of the waveforms corresponding to the two limiting levels. With selection of p = 0.5, the following values have been determined:

$N = 180; D = 4; k_1 = k_2 = k_3 = k_4 = 10;$ $n_1 = n_2 = n_3 = n_4 = 45.$

This yields:

$k = 40; k_e = 30; r = 2/9.$

In this example, the symbols of the supplementary signal stream have been given in binary code and the logical meaning associated with the modification of the symbols of the main signal stream has been so chosen that a logical "1" corresponds to a modification caused by increasing the absolute value of the waveform of the mainstream symbol associated therewith, by a value equal to the distance between two adjacent levels; the logical value "0" is assigned, on the other hand, to a state of absence of modification of the corresponding waveform of the main signal stream.

The correspondence between the supplementary message symbols and those of the main signal stream is defined according to the following principle: in each interval $n_iT$ (i = 1,2, ... D) of each frame of the supplementary signal stream, the first 10 mainstream symbols corresponding to the limiting levels have been allocated to 10 symbols of the supplementary stream; all the other mainstream symbols, whether or not they correspond to the limiting levels, are not assigned to any supplementary message character and therefore the waveforms relating to them do not undergo any modification.

For reasons that will become apparent from the following description of the operation of the system according to my invention, the frame-alignment word is formed, as already said, by an initial fixed part, which indicates the start of each frame of the supplementary signal stream, and by a variable part, which indicates the number of mainstream symbols occurring between the mainstream symbol which corresponds to the beginning of the supplementary frame and the first mainstream symbol which corresponds to a modulable waveform.

In the embodiment here described, the fixed part of the alignment word consists of the 4-bit configuration 1001; the variable part consists of 6 bits.

Once the aforedescribed mode of allocation of the symbols of the supplementary signal stream to those of the main signal stream has been established, and according to the characteristics of the supplementary signal stream, it may be desirable to codify the supplementary signal stream before its introduction into the main signal stream, bearing in mind that bits "0" of the supplementary signal stream do not involve any modification of the waveform of the main signal stream and are therefore sent without expenditure of energy, contrary to the transmission of bits "1". Thus it may be advantageous to adopt some known coding system for the supplementary signal stream allowing a reduction in the number of bits "1" even though requiring an increase in the overall number of bits to be transmitted.

In the case in which at the transmitting end means are provided to codify the supplementary message signals, suitable means are to be employed at the receiving section to accomplish the complementary decodification.

In FIG. 1 I have shown a standard pulse generator GP1 which receives at its input, from a wire 10, the train of waveforms associated with the line symbols of the main signal stream and emits over a wire 9 a marking pulse coinciding with any modulable waveform, i.e.

a code configuration adapted to be altered through the addition of the symbols relating to the supplementary signal stream.

A conventional synchronizing circuit RS1 extracts timing signals from the main information flow present on wire 10 and emits, over an output lead 1, a clock pulse every T seconds.

A pulse counter CL1, of cyclical type, counts the clock pulses on lead 1 recurring at the frequency of the mainstream symbols transmitted on outgoing channel 10. Counter CL1 also emits, over wires 2, 3, 5 and 6, periodical waveforms whose frequencies are aliquot submultiples of the symbol frequency and, over a connection 4, an appropriate bit configuration indicating the cumulative pulse count.

The shape taken on by these waves during a given time will be discussed hereinafter in connection with FIG. 3a.

An optional coder C1 receives from connection 4 the bit configuration coming from counter CL1, carries out a codification thereof, which will be described later, and emits the resulting code bits over a connection 7.

A conventional bistable circuit or flip-flop F1 is reset by the signal it receives from wire 5 and generates only one signal pulse on a wire 8 in response to the first marking pulse it receives from wire 9 after having been reset.

A register R1 is theoretically subdivided into two portions, the first of which contains a predetermined bit configuration in binary code which forms the fixed part of the frame-alignment word and is permanently stored therein, as by wiring; the second register portion stores, upon the occurrence of a switchover pulse coming from flip-flop F1 over wire 8, the bit configuration emitted by coder C1 over connection 7, which represents the variable part of the alignment word.

Register R1 reads out in succession, over a connection 11, the two bit configurations constituting the fixed and the variable part of a frame-alignment word.

An optional read-only memory M1 of any known type emits, over a connection 12, a predetermined binary digital expression according to the bit configuration it receives at its input from counter CL1 over connection 4; as will be shown later, this memory is used only in the case in which the expected number of symbols transmitted in each subframe of the supplementary signal stream is different for the various subframes.

A source of supplementary messages, generally designated SS, is timed as to its symbol-transmission rate by a signal coming from counter CL1 through wire 2.

Figure 3:
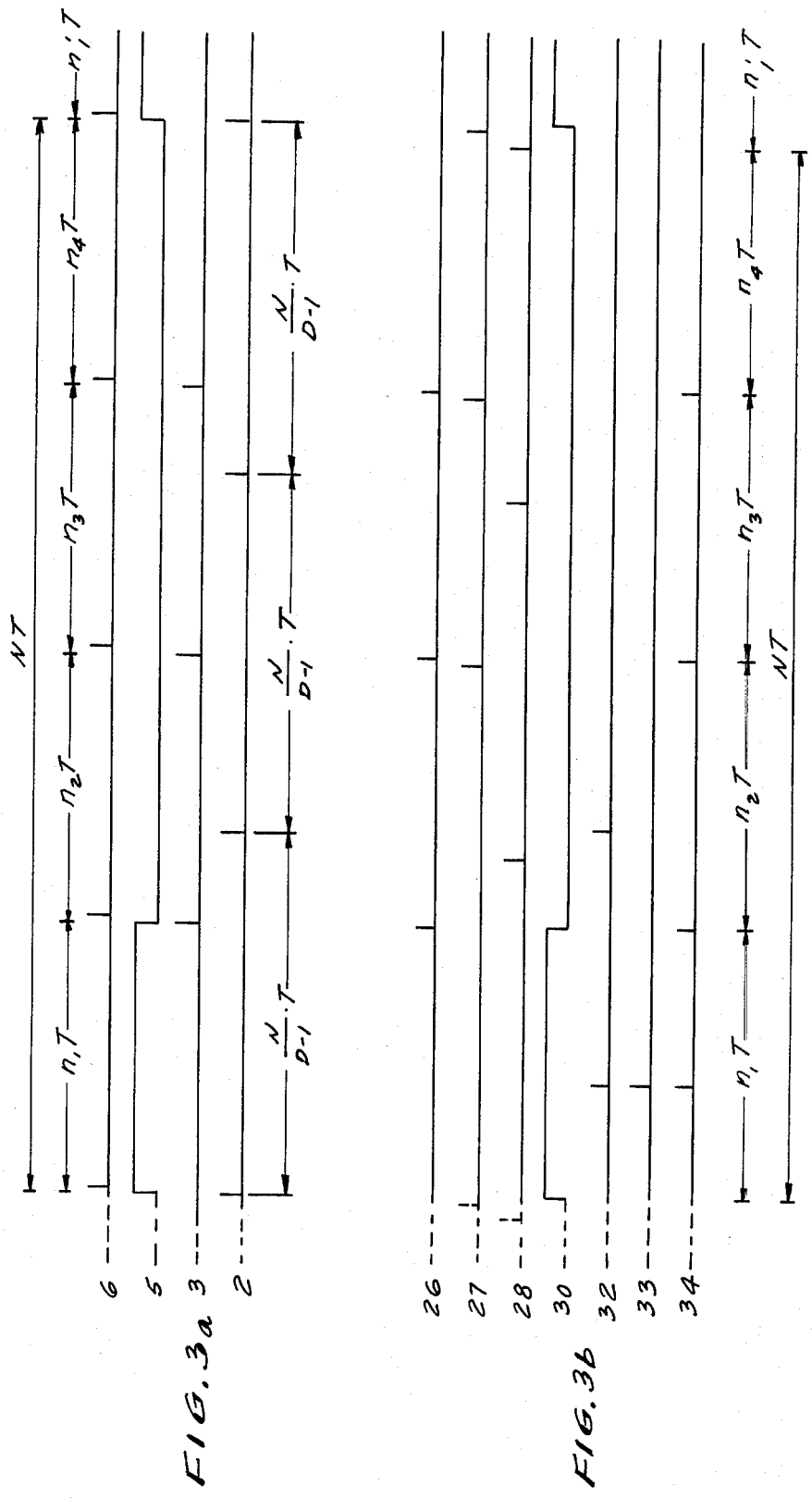
FIGS. 3a and 3b are two sets of graphs showing frame timing signals generated in the transmitting section and in the receiving section, respectively.

From the preceding description it will be apparent that the number of binary symbols sent by source SS over a connection 13, in the course of each frame period NT of the supplementary signal stream, must be equal to the given number $k_e$ of equation (6); more particularly, in the embodiment here described, it has been assumed that, as will be shown in connection with FIG. 3a, source SS (FIG. 1) is capable of emitting a 10-bit word with each pulse of the recurrent signal it receives from wire 2, that word having a recurrence period equal to $$\frac{N}{D-1} T.$$

A buffer memory M2 temporarily stores in parallel the bits it receives from source SS via connection 13, under the control of the timing signal present on wire 2.

The emission in parallel of the stored bits by memory M2, over a connection 14, is accomplished upon the occurrence of the signal received from counter CL1 over wire 3. In the case in which the intervention of memory M1 is required, the number of bits that memory M2 has to read out over connection 14 is indicated by a signal coming from memory M1 over connection 12.

Another optional coder C2, of the same type as coder C1, encodes the bits it receives from connection 14 according to the indications arriving from memory M1 over connection 12; coder C2 emits the resulting code bits on a connection 15.

The reasons for the possible utilization of coders C1, C2 have to do with the problem of minimizing the energy required to transmit the supplementary message signals, as discussed above.

A conventional selector or multiplexer SE1, responding to the signal present on wire 5, transmits over an output connection 16 the bit configuration present at a first data input, which is linked to connection 15, or the bit configuration present at a second data input, linked to connection 11 coming from register R1.

Another pulse counter CC1, having a stepping input connected to wire 9, counts the marking pulses of monitoring generator GP1, starting from the instant when it receives a resetting pulse from wire 6; counter CC1 supplies, on an output connection 59, the total pulse count registered at any instant.

The counting capacity of counter CC1 exceeds by one unit the highest number of bits $k_1, k_2, \ldots k_D$ of the supplementary signal stream expected during subframe intervals $n_1T, n_2T, \ldots n_DT$, respectively. When counter CC1 attains its highest count, the pulses present at its stepping input connected to wire 9 do not cause any modification of its reading up to the arrival of a resetting pulse over wire 6.

Another conventional multiplexer SE2 is switchable by a signal it receives from counter CC1, over connection 59, to connect the wires of multiple 16 to an output lead 17.

When the bit configuration corresponding to the highest reading of counter CC1 is present on connection 59, the output signal of multiplexer SE2 appearing on wire 17 has the logical value "0".

A conventional waveform generator GF receives on a first input, connected to wire 10, the main information signals; at a second input, connected to wire 9, it receives the marking pulses transmitted by the monitoring pulse generator GP1; and at a third input, connected to wire 17, it receives the signal coming from selector or multiplexer SE2. Upon the arrival of any marking pulse at its second input, generator GF emits, over an output wire 19, a bipolar modification pulse whose sign is determined by the signal received on its first input connected to conductor 10 and whose amplitude is determined by the signal received from multiplexer SE2 on its third input.

In the particular example here described, the amplitude of the waveform generated by unit GF is equal to 0 when at the third input, connected to wire 17, a logical level corresponding to symbol "0" is present.

A delay line L1 serves to retard the signals received from wire 10 by a time period equal to the processing time required by the remaining parts of the system.

A conventional adder S1 of analog type superimposes the waveform modification pulses it receives from generator GF, over wire 19, upon the modulable waveforms of the signal it receives from delay line L1 over a wire 20.

A composite signal emitted by adder S1, present on a wire 21, contains both the main information signal and the supplementary message signal.

Figure 2:
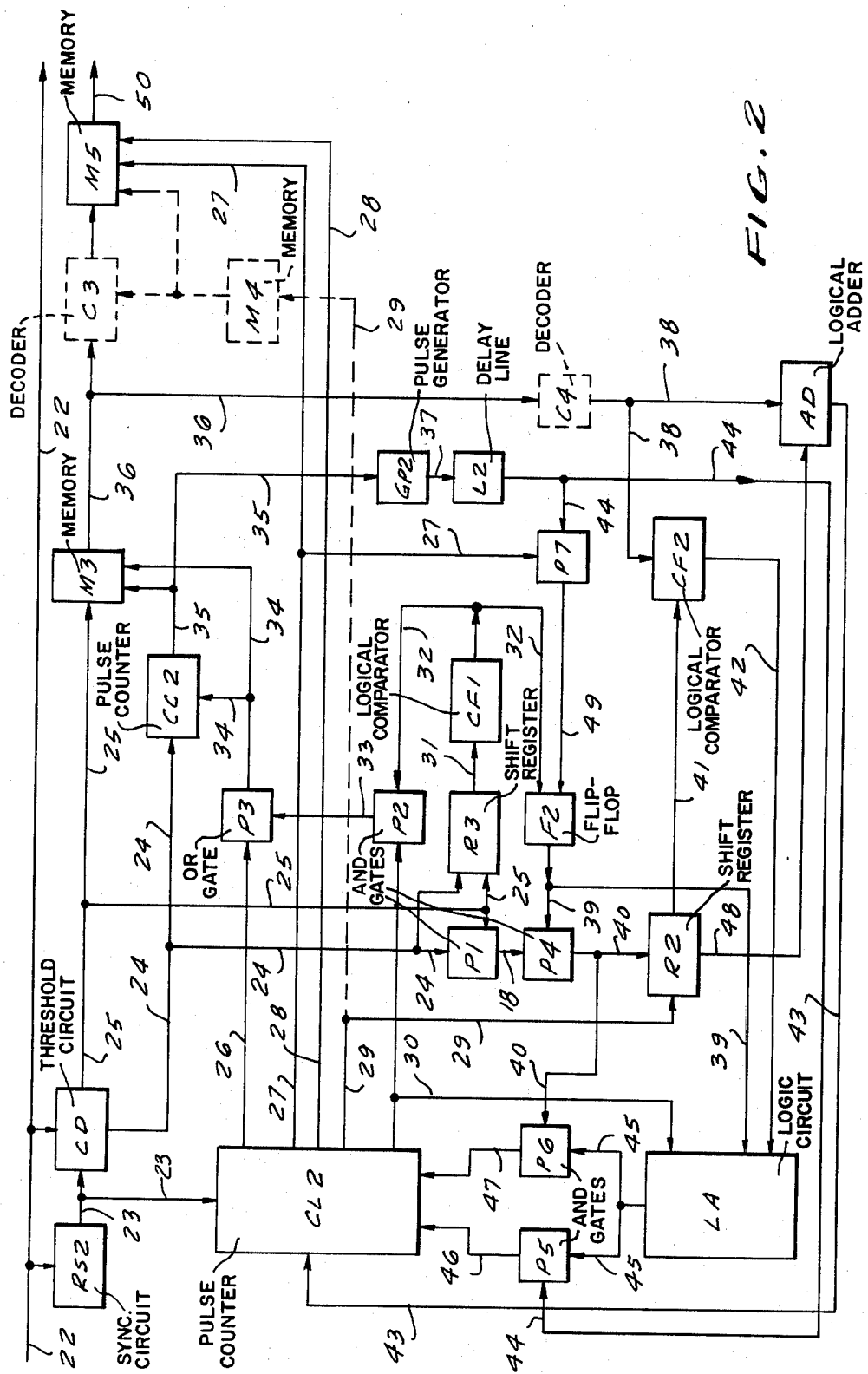
FIG. 2 is a block diagram of the receiving section of the system.

In FIG. 2 I have shown a conventional synchronizing circuit RS2, similar to circuit RS1 of FIG. 1, able to extract clock pulses from an incoming flow of stepped waveforms present on a wire 22 which constitutes an incoming channel.

Circuit RS2 emits, over a wire 23, a clock pulse every T seconds.

A threshold discriminator CD is designed to receive the composite signals present on wire 22 and to recognize, at the cadence established by the timing signals it receives from sync circuit RS2 over wire 23, the symbols of the incoming signal stream exceeding a given number of predetermined thresholds. In this way it is able to detect, within the incoming signal stream, the waveforms which carry the supplementary message signals by comparing these stepped waveforms with a first pair of thresholds in order to decide whether or not the waveform is modulable, i.e. whether it has an amplitude at or beyond either of the normal range limits, and with a second pair of thresholds in order to decide whether this modulation corresponds to a supplementary-stream symbol of logical value "1" or "0".

Circuit CD emits a confirmation pulse over a wire 24, if it has detected a modulable waveform, and further emits a logical "1" as a demodulation pulse on a wire 25 if that waveform has been modulated by a logical "1".

A cyclical pulse counter of the same type as marking-pulse counter CL1 (FIG. 1) registers the clock pulses on wire 23, recurring at the symbol frequency, emitting over wires 26, 27, 28, 30 periodical waveforms having frequencies that are aliquot submultiples of the symbol frequency and further emitting, over a connection 29, a suitable bit configuration; the shape of these waves during a given time and the organization of that bit configuration will be discussed hereinafter with reference to FIG. 3b.

A shift register R3 of the input-series/output-parallel type, having two inputs and one output, stores the logical state of the demodulation signal present on wire 25, connected to one of its inputs, at the instants when it receives a confirmation pulse from wire 24, connected to its other input. Register R3 thereupon emits, on a connection 31, a predetermined bit configuration in parallel having as many bits as are allotted to the fixed part of the frame-alignment word.

Verification of frame alignment is carried out by two logical comparators CF1, CF2. Unit CF1, in which the fixed part of the frame-alignment word is stored, compares same with the bit configuration it receives from register R3 over connection 31; if the result of the comparison is positive, unit CF1 emits a pulse on its output wire 32.

A logical AND gate P2, with two inputs and one output, transfers to a wire 33 the verification pulse it receives over wire 32 if, as will be shown in more detail in connection with FIG. 3b, a logical "1" is present at its other input connected to wire 30.

A logical OR gate P3 transfers to a wire 34 the pulses present on its inputs connected to wires 26 and 33.

A conventional binary pulse counter CC2 receives at a first input the confirmation pulses appearing on the output lead 24 of circuit CD and at a second input a resetting signal, transmitted by gate P3 over wire 34; counter CC2 delivers, over a connection 35, a bit configuration indicating the number of confirmation pulses sent by threshold circuit CD on wire 24, starting from the arrival of the resetting pulse from gate P3.

The counting capacity of counter CC2 exceeds by one unit the maximum number of supplementary bits expected in any subframe, i.e. the highest among the number of bits included in the variable part of the alignment word and the number of supplementary-message bits $k_2, k_3, \ldots k_D$ occurring in subframe intervals $n_iT$ (i = 2,3, ... D). When counter CC2 attains its highest count, the confirmation pulses present at its first input connected to wire 24 do not cause any modification of its reading up to the arrival of a resetting pulse from the gate P3 over wire 34 connected to its second input.

A memory M3 is made up of a number of cells equal to the maximum number of supplementary bits expected in any subframe, as noted above.

During the writing phase the cells of memory M3 are scanned in ordered succession by the signal coming from counter CC2 over connection 35; when connection 35 carries the bit configuration corresponding to the highest count of unit CC2, which is not assigned to any cell of memory M3, no data are entered in this memory. Stored data are always available on an output connection 36; the simultaneous resetting of all cells of memory M3 is accomplished by the signal coming from gate P3, through wire 34.

A decoder C3 and a memory M4 have functions complementary to those respectively performed by blocks C2 and M2 of FIG. 1 in the same situation in which these blocks are required, i.e. in cases where the expected number of symbols in the several subframes of the supplementary frame is not uniform.

A buffer memory M5 has a function complementary to that of the similar memory M2 of FIG. 1; an output 50 of memory M5 carries the supplementary symbols recovered from the received signal stream.

A conventional pulse generator GP2 emits an outgoing pulse on a wire 37 whenever it receives from connection 35 a configuration corresponding to the number of bits expected for the transmission of the variable part of the frame-alignment word; in the example described here, that number is equal to 6.

A delay line L2 introduces a suitable delay, equal to the processing time of circuits AD, CF2 and LA described hereinafter, on the signal coming from generator GP2 over wire 37; line L2 transmits the delayed signal over an outgoing wire 44.

An OR gate P7, receiving at its two inputs the pulse trains present on wires 27 and 44, emits both these pulse trains on an output wire 49.

An optional decoder C4 has a function complementary to that of the coder C1 of FIG. 1; it operates in a situation identical with that in which the service of coder C1 is required.

A conventional flip-flop or bistable multivibrator F2, of the type usually designated SET-RESET, emits on a wire 39 a logical "1", if it receives a pulse at its setting input from wire 49, and a logical "0" whenever it receives a pulse at its resetting input connected to wire 32.

A logical AND gate P1 transfers to a wire 18 the confirmation pulses it receives at a first input, connected to wire 24, when at its second input, connected to wire 25, a demodulation pulse indicative of the first bit of the fixed part of the alignment word is present; in the example given herein, that bit is a logical "1".

Another AND gate P4 transfers to a wire 40 the pulse present on wire 18 if it is enabled by the presence of a logical "1" at its other input connected to wire 39.

A shift register R2 has several cells in parallel in each of the stages following one another in the shifting direction. The stages of register R2 are as many as are the bits of logical value "1" included in the fixed part of the alignment word; the number of cells in parallel is chosen in dependence upon the highest number of symbols of the main signal stream which according to probability may flow between the transmission of two successive bits "1" of the supplementary signal stream. In any case this number of cells is never smaller than the number of bits forming the variable part of the alignment word.

At the instants when register R2 receives a pulse from wire 40, coming from gate P4, it stores the bit configuration present on connection 29, and at the same time causes the previously stored configuration to shift by one step.

One output of register R2 works into a connection 41 carrying the bit configuration of earliest storage, whereas a connection 48 extending from another output thereof makes available the contents of all parallel-connected cells of each register stage except for the stage whose contents appear on connection 41.

The other verifying unit CP2, having two inputs and one output, compares the bit configuration present on connection 41, coming from register R2, with the one present on a connection 38, coming from decoder C4; comparator CF2 emits, over a wire 42, a logical "1" whenever this comparison establishes the identity of the two bit configurations.

A logical adding circuit AD forms the sum of the number represented by the bit configuration present on connection 38 and of the numbers given by the bit configurations present on connection 48 extending from register R2.

The result of this addition is made available on a connection 43 terminating at counter CL2. The latter also has inputs connected to output leads 46, 47 of a pair of logical AND gates P5 and P6.

At LA I have indicated a logic circuit of sequential type, whose operation will be dealt with hereinafter in connection with FIG. 8; according to the logic configuration of the signals it receives at its inputs from wires 30, 39, 42, network LA emits over a wire 45 either a logical "1" or a logical "0", the former serving as an unblocking signal for gates P5, P6.

In the presence of this unblocking signal, gates P5, P6 transmit over wires 46, 47 the signals they receive from wires 44, 40, respectively.

In the course of the description of FIGS. 3a, 3b, 4, 5, 6, 7, which show the waveforms and the signals present on various connections of FIGS. 1 and 2, these waveforms and signals will be labeled with the same reference numbers as the connections on which they appear.

FIG. 3a shows the signals generated by the cyclical counter CL, except only for the signals present on connection 4 which represent the progressively increasing clock-pulse count as already described.

The time diagram of FIG. 3a represents a frame of duration NT which, in accordance with this particular example, has been assumed as subdivided into 4 subframe intervals $n_1T, n_2T, n_3T, n_4T$ of equal duration, timed by the pulses of signal 6.

At the first interval $n_1T$, signal 5 has logic value "1" so as to enable, as will be shown, the operations connected with the transmission of the alignment word.

It will be noted that the pulses of signal 6 are slightly delayed with respect to the leading edges of signal 5 and to the pulses of signal 3, in order to ensure the accurate operation of the system in spite of the occurrence of unavoidable circuit delays.

Signals 2, 3 are used for timing buffer memory M2 (FIG. 1). Signal 2 establishes the loading instants for the memory M2 (FIG. 1) and at the same time the instants of the emission of symbols by source SS, with period $NT/D-1$; signal 3 establishes the emission phases of memory M2 (FIG. 1) and is made up of three pulses.

As the frame is assumed to be divided into four intervals, the first of which is assigned to the alignment word, there are only three intervals available for the transmission of the supplementary information signal.

In FIG. 3b, signals 26, 28, 30 at the receiving end are analogous to signals 3, 2, 5, respectively, shown in FIG. 3a with reference to the transmitting section, and therefore they are subject to the considerations set forth.

The pulses of signal 27 mark the end of the intervals provided for the transmission of the message conveyed by the supplementary signal stream.

The verification pulses 32, as already stated, come into existence whenever comparator CF1 (FIG. 2) recognizes a bit configuration equal to that expected for the fixed part of the frame-alignment word.

Signal 33 is formed by the verification pulses 32 which occur when signal 30 is high.

Signal 34 is a combination of signals 26 and 33.

Figure 4:
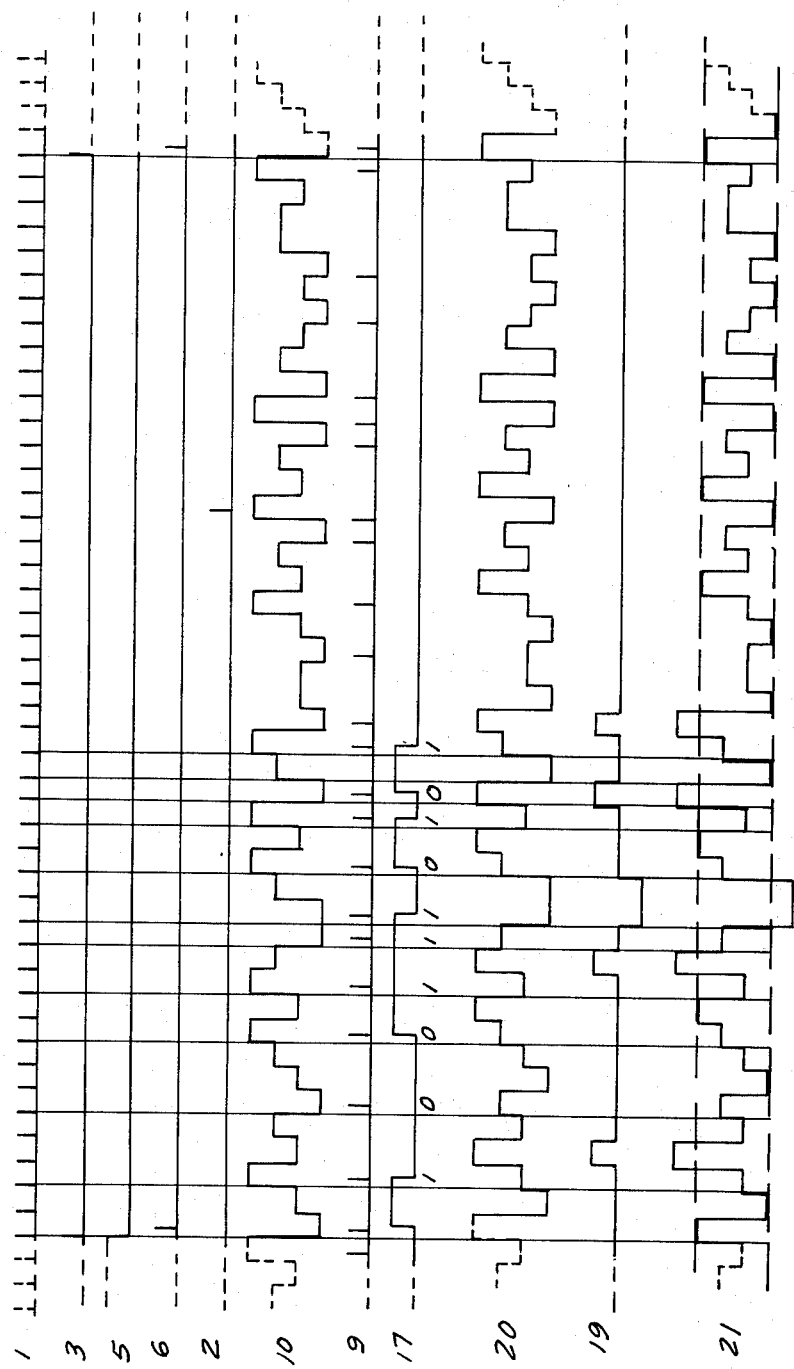
FIG. 4 is a set of graphs illustrating waveforms relating to a particular set of signals transmitted in a frame interval.

FIG. 4 shows a particular example of transmission of a supplementary message inserted into the interval $n_2T$ (FIG. 3a), consisting of the following binary succession of 10 bits:

1 0 0 1 1 1 0 1 0 1

In FIG. 4, signals 2, 3, 5, 6 are the same as those of FIG. 3a, on an expanded scale; signal 1 is the basic clock signal received by counter CL1 (FIG. 1), having a pulse cadence equal to the symbol frequency of the main signal stream.

Signal 10 (FIG. 4) is the sequence of stepped waveforms assumed for the main signal stream. Signal 9 is formed by a series of marking pulses which appear in coincidence with the modulable waveforms of signal 10, i.e. with amplitudes at the lowest and the highest of the four levels illustrated. Signal 17 carries the supplementary message to be transmitted in the following way: after each marking pulse 9, it takes the logic value corresponding to the bit of the supplementary message signal to be transmitted upon the occurrence of the next marking pulse 9. Signal 19 is a bipolar pulse train carrying the supplementary message to be superimposed upon the signal 20 which corresponds to the main information signal 10 delayed by a time here equal to a symbol period of the main signal stream, i.e. a cycle of clock pulses 1.

Finally, signal 21 represents the sum of the main information (20) and the supplementary message (19) and is present on wire 21 at the output of the transmitter of FIG. 1.

Figure 5:
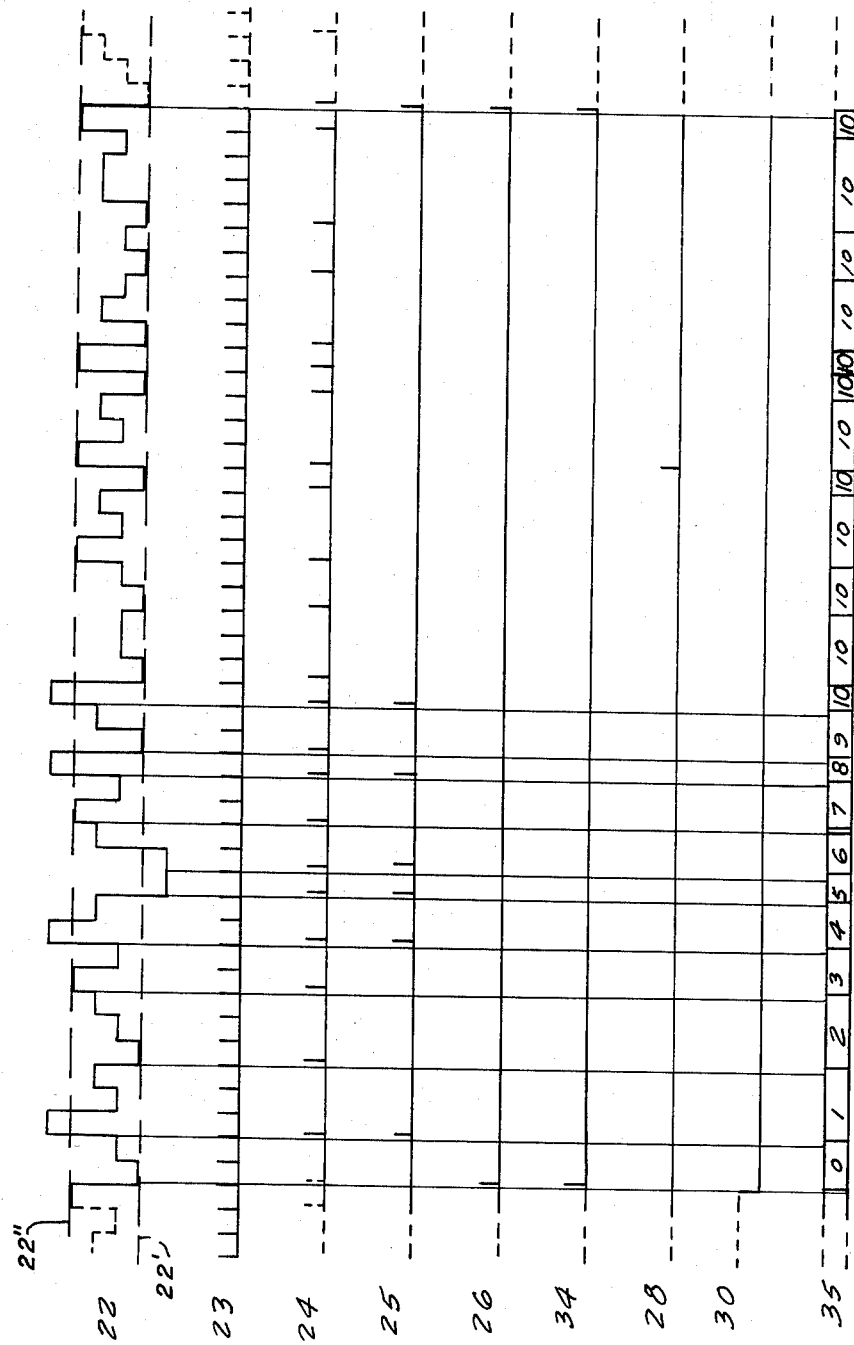
FIG. 5 is a set of graphs illustrating waveforms relating to the signals shown in FIG. 4, considered here as being received during a frame interval.

FIG. 5 shows, in a manner similar to that of FIG. 4, the shape of the signals present on wires 22, 23, 24, 25, 26, 28, 30, 34 of the receiving section (FIG. 2) as a consequence of the reception of the particular supplementary message superimposed upon certain waveforms of the main signal stream, as already discussed in connection with the transmitting section.

The bit configurations present on connection 35 are represented in the bottom row of FIG. 5 by the number in decimal digits which, according to these binary configurations, corresponds to the reading of counter CC2 (FIG. 2) at the instants marked by the confirmation pulses 24; it has been assumed, in accordance with the particular example here described, that this counter has only eleven counting positions and, therefore, once number 10 is attained, as already explained, it stops at that count.

Waveform sequence 22 is the received composite signal, and corresponds to signal 21 synthesized from signals 19 and 20 in FIG. 4; signal 23 is the basic clock signal, having a frequency equal to the cadence of the mainstream symbols, and is derived from sync circuit RS2 (FIG. 2).

Confirmation pulses 24 coincide with the modulable waveforms of signal 22; demodulation pulses 25 coincide with the modulable waveforms that are modified to lie beyond the lower and upper range limits 22', 22" of signal 22.

Figure 6:
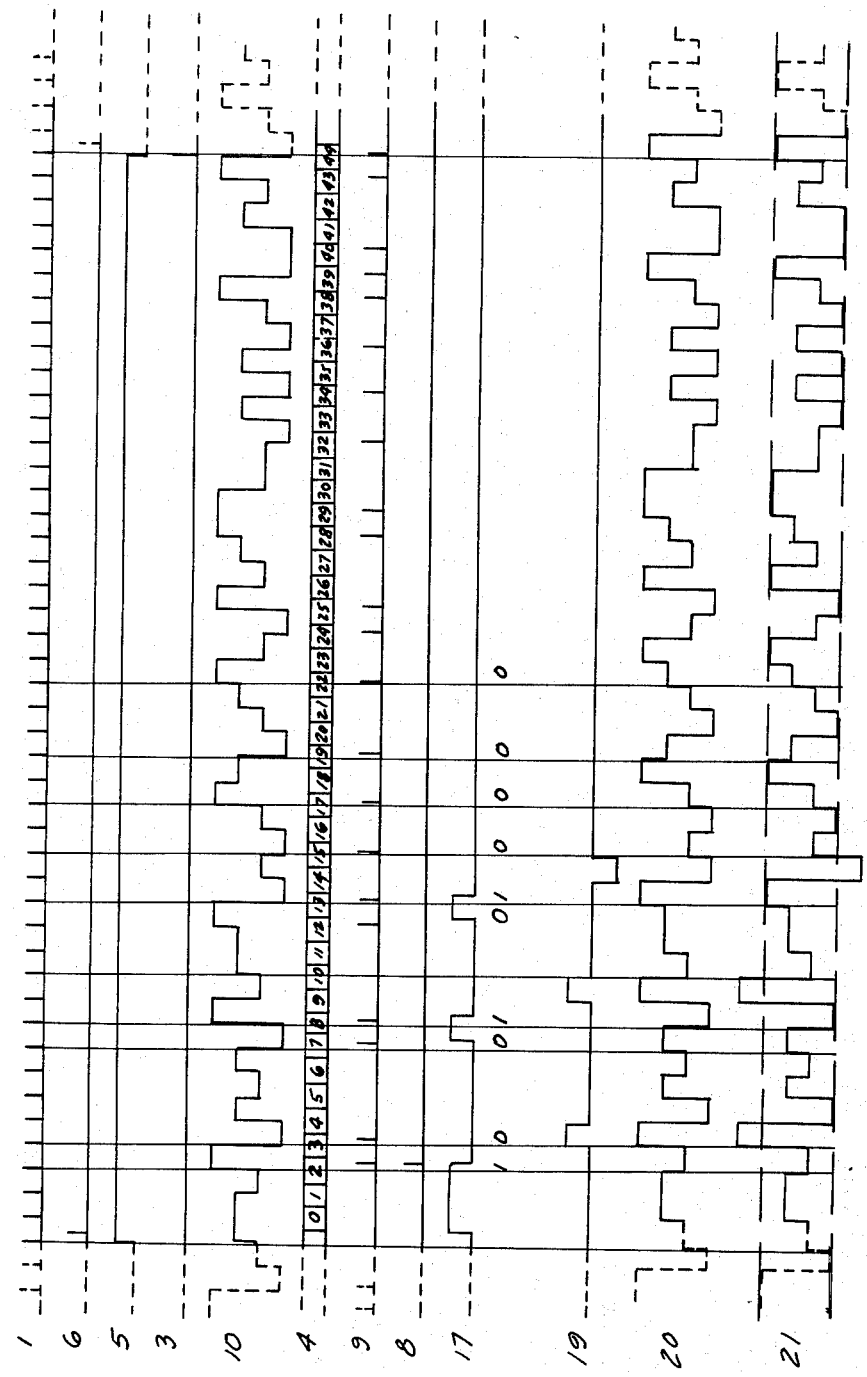
FIG. 6 is a set of graphs illustrating waveforms occurring at the transmitting end in an interval allotted to the alignment of the supplementary-signal frame, for a particular set of signals and for a given frame word.

FIG. 6 shows a particular example of transmission of the frame-alignment word whose first part is, as already stated, to be made up of the binary configuration 1001 and whose variable part is formed of the configuration of the six binary digits which indicate the number of symbols encountered from the beginning of the frame up to the first symbol of the main signal stream corresponding to a modulable waveform; in this particular case that number is equal to 2 and is transmitted as configuration 010000.

The frame-alignment word is therefore formed by the binary series

1001010000 which is represented in FIG. 6 on row 17 in conformity with the homonymous wire of FIG. 1 on which this configuration is serially transmitted.

The waveform of signal 17 is a sequence of bits coinciding with the marking pulses 9 which are generated in coincidence with the modulable waveforms of the main signal stream.

In FIG. 6, signals 1, 3, 5, 6 are the same as those shown in FIG. 4, except that the time interval represented in FIG. 6 is the subframe $n_1T$, relating to the frame-alignment word, instead of the subframe $n_2T$, allotted to the transmission of the supplementary signal stream, shown in FIG. 4.

Signal 10 (FIG. 6) represents the stepped waveforms assumed for the main signal stream; since the time interval is not the same as that examined in FIG. 4, the shape of the wave will obviously also be different.

Row 4 (FIG. 6) displays, in the form of decimal digits, the number corresponding to the binary configuration present on connection 4 (FIG. 1).

Signal 8 of FIG. 6 is used for determining the instant when register R1 (FIG. 1) is loaded with the variable part of the frame-alignment word shown on row 4.

Signals 19, 20, 21 have the same meaning as the homonymous signals of FIG. 4, except for the difference in the subframe interval considered and in the message associated with that interval.

Figure 7:
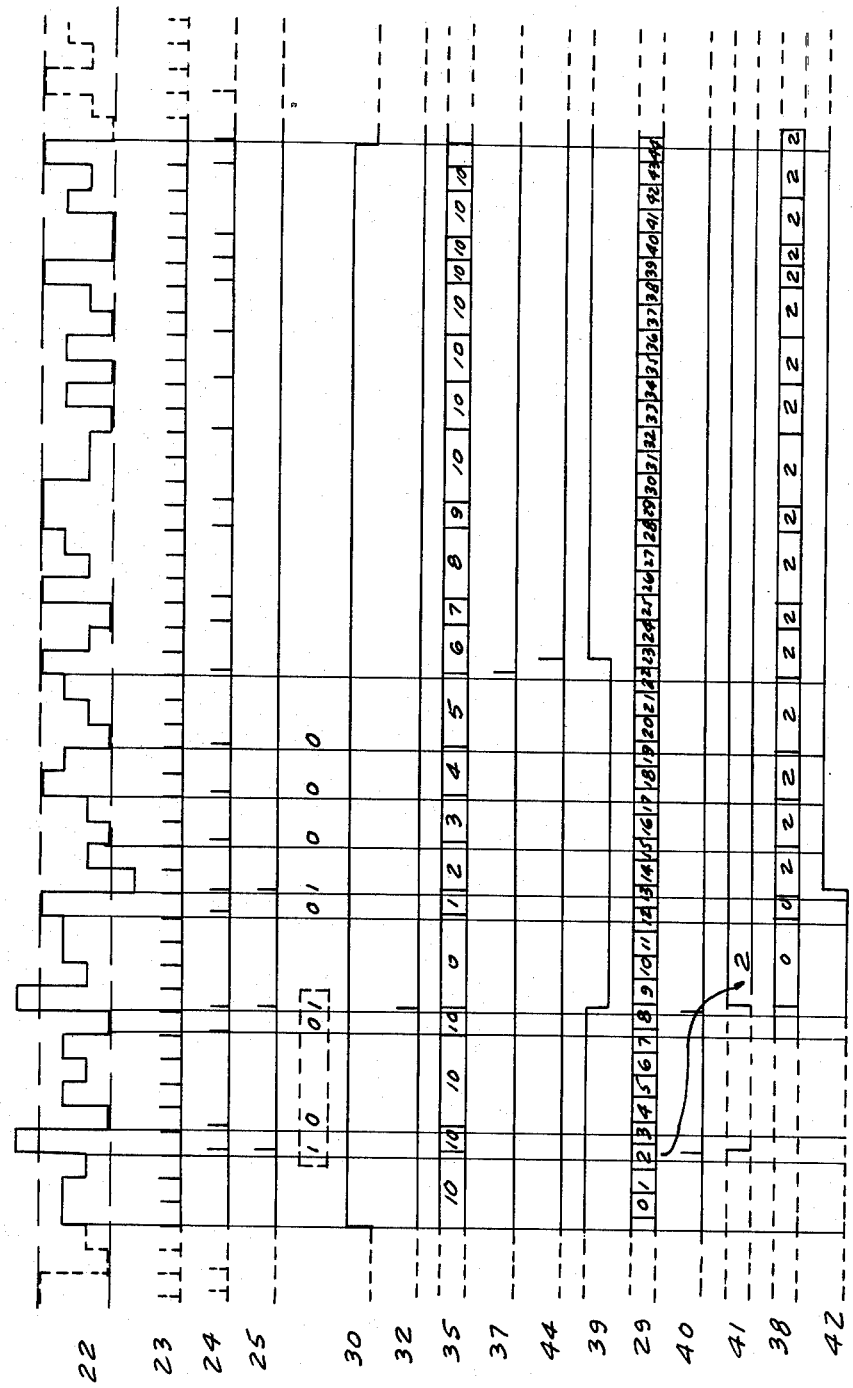
FIG. 7 is a set of graphs illustrating waveforms at the receiving end in a frame-alignment interval with the frame word shown in FIG. 6.

FIG. 7 illustrates in row 25 the same exemplary frame-alignment word as shown in row 17 of FIG. 6, the way it appears at the receiving end.

Waveforms 22 constitute the composite signal stream carrying the main information and the supplementary message, corresponding at the receiving end to the transmitted signal 21 of FIG. 6.

Signals 23, 24, 25, 30, 35 are the same as those shown in FIG. 5, aside from the different time intervals considered in the two Figures.

The verification pulse 32 is emitted by comparator CF1 (FIG. 2) upon the recognition, at the receiving end, of the binary configuration of the fixed part of the frame-alignment word.

The signal pulse 37 indicates the instant of reception of the last bit of the frame-alignment word (in the example, the sixth bit after reception of the fixed part of that word).

Signal 44 is equal to signal 37, suitably retarded by delay line L2 (FIG. 2).

Signal 39 marks the time interval between the instant of detection of the fixed part of the alignment word and the instant indicated by the pulse 44.

Row 29 carries the counting signal decadically represented at row 4 of FIG. 6, as recovered at the receiving end.

Signal 40 consists of the demodulation pulses 25 that appear in this subframe $n_1T$ outside the time interval in which signal 39 is low.

Rows 38, 41 show in decimal digits the bit configurations present on connections 38, 41 of FIG. 2; the dashed part corresponds to configurations which cannot be detected in the example shown here, being dependent upon the prior situation of the signals not included in FIG. 7.

Signal 42 goes from logic "0" to a logical "1" when the binary configuration of signal 41 matches that of signal 38, i.e. has the numerical value "2" in the case here assumed.

Figure 8:
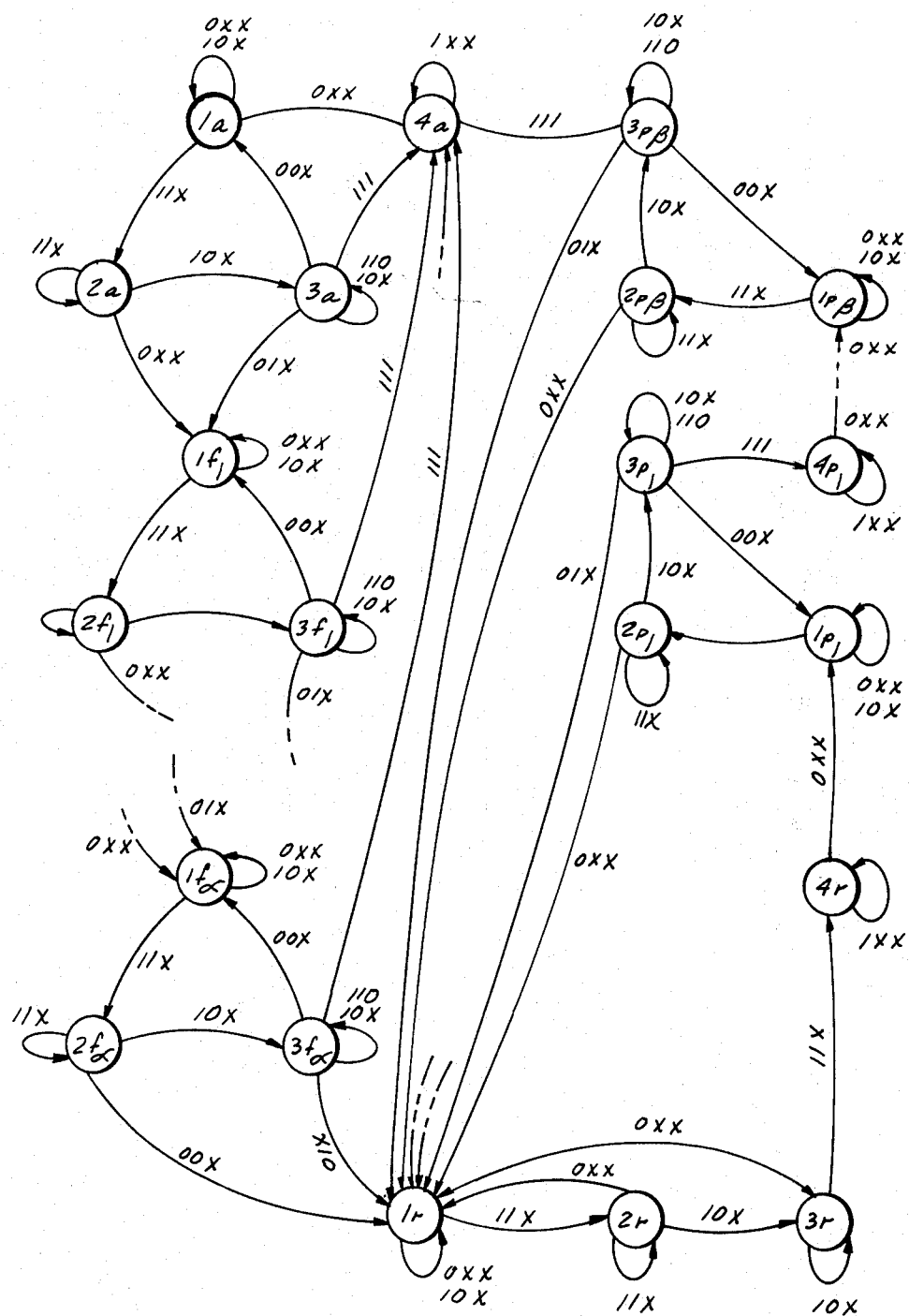
FIG. 8 is a flow chart representing the operation of a circuit component designated LA in FIG. 2.

FIG. 8 presents the flow chart illustrating the operation of the logic network LA (FIG. 2).

The diagram consists of small circles linked to one another by arrows. Each circle carries an alphanumeric notation, which identifies the phase and the state of the logic to which the circule relates; beside each arrow three numerals are written, consisting of a combination of the symbols 1,0,X, where 1 and 0 are binary symbols and X is the so-called "don't care" sign denoting indifference.

There are, altogether, four groups of phases identified by postscripts a; $f_1, f_2, \ldots f_\alpha$; $p_1, p_2, \ldots p_\beta$; r. Each phase has a number of possible states variable from 1 to 4. Postscripts a, f, p and r respectively signify "alignment established", "failure of alignment", "re-establishment" and "provisional alignment".

Thus, for example, 1a is the first state of the phase a; 2a, 3a are the next two states; $1f_1$ is the first state of the phase $f_1$, $2f_1$ is its second one; $1f_\alpha$ is the first state of the phase $f_\alpha$, $3f_\alpha$ is its third state; and so forth.

The notations shown beside the arrows indicated the logical state of the signal respectively present on input leads 30, 39, 42 (FIGS. 2, 7) of network LA; if the arrow ends on the same circle it will mean that, with the digit configuration of that arrow, state and phase remain unchanged.

Thus, the arrow which, for instance, connects circles 1a, 2a and is marked by the notation 11X means that, whatever the logical value of the signal on wire 42 (FIG. 2) may be, a transition occurs from state 1a to state 2a, provided a logical "1" is present on wires 30 and 39 (FIG. 2).

Obviously, with each state of each phase of logic network LA there is associated a logical output level present on wire 45; I have not encumbered the diagram of FIG. 8 with this logical output level since, as will be explained later on, the only states during which a logical "1" appears on wire 45 of network LA (FIG. 2) are states 1r, 2r, 3r whereas a logical "0" is obtained in all the other cases.

The complete explanation of the changes of state shown in FIG. 8 will be given later in conjunction with the description of the operation of the receiving section of FIG. 2. First, however, I shall describe the transmitting section of FIG. 1.

According to the assumption made in connection with FIGS. 3a, 3b, 4, 5, 6 and 7, the first supplementary message to be superimposed upon the main signal stream is the frame-alignment word, a particular case of which is shown in FIG. 6.

During the interval in which signal 5 is high, coinciding with the subframe assigned to the transmission of the frame-alignment word, selector SE1 (FIG. 1) is positioned by signal 5 on its input connection 11 extending from the register R1 on which there is always available the binary configuration relating to the fixed part of the frame-alignment word.

At the beginning of this interval, signal 6 zeroizes the counter CC1 (FIG. 1) which positions selector SE2 on its input linked to that particular wire of connection 16 which carries the first bit of the alignment word; in the particular case examined here, that bit is a logical "1", as may be seen from row 17 of FIG. 6.

The same transition from "0" to "1" of signal 5, at the beginning of this interval, enables flip-flop F1 (FIG. 1) to generate a starting pulse 8 in response to the first marking pulse it receives from wire 9; as already said, these marking pulses 9 are emitted by pulse generator GP1, which monitors the main signal stream, whenever a modulable waveform appears on the transmitting channel constituted by wire 10.

In the particular case of FIG. 6, the first marking pulse generated by monitoring unit GP1 (FIG. 1) on wire 9 occurs in the presence of numerical value "2" on connection 4, which means that, from the beginning of the interval, only two symbols of the main signal stream have appeared.

Flip-flop F1, tripped by this first marking pulse 9, now produces the starting pulse 8 which causes the loading of the cells of register R1 (FIG. 1) assigned to the variable part of the frame-alignment word; this variable part, corresponding to numerical value "2", is represented in binary form and may be transcoded by device C1.

The first marking pulse 9 also causes circuit GF to generate the first supplementary waveform (modification pulse 19 of FIG. 6); this first supplementary waveform is represented by a pulse of positive sign, since the corresponding mainstream symbol on wire 10 (FIG. 1) is positive, and the modulation may take place through a simple summing operation, in adder S1, according to the procedures discussed hereinbefore.

For proper modulation, the modification pulse on wire 19 must be synchronized with the corresponding mainstream symbol; hence, the signal present on wire 10 is delayed in line L1 by a time equal to that required for the generation of the modification pulse 19 and is thereafter sent to adder S1 over wire 20.

Furthermore, the first marking pulse 9 steps the counter CC1 by a counting unit. The resulting bit configuration read out from counter CC1 on connection 59 positions the multiplexer SE2 on its input linked to a particular wire of connection 16 which carries the second bit of the frame-alignment word to be transmitted; in the present case this bit is a logical "0", as indicated on row 17 of FIG. 6. In response to the second marking pulse present on wire 9 (FIG. 1), the second bit of the frame-alignment word is then transmitted, with a procedure similar to the transmission of the first bit; the only difference lies in that this bit is a logical "0" whose transfer by multiplexer SE2 on wire 17 to circuit GF does not generate any waveform on output lead 19. Thus, unit S1 adds to the signal present on wire 20 a zero signal, and therefore the signal present on wire 20 passes completely unaltered onto wire 21.

Analogous conditions obviously apply to all the remaining bits of the frame-alignment word.

It should be noted that the sixth bit of the alignment word is a logical "1" which gives rise to a negative pulse 19 in the output of generator GF.

This is so because such bit is to be transmitted by altering a waveform corresponding to an extreme negative level of the mainstream signal treated according to the modulation principles set forth above.

Once the last bit of the alignment word has been transmitted, which in this instance is the tenth bit, selector SE2 emits on its output lead 17 a logical "0", being positioned by counter CC1 on an input which carries in any case a logical "0" produced for example by a prewired connection, as in the case assumed above, or provided by selector SE1 through connection 16; as already seen, the logical "0" emitted by selector SE2 on wire 17 blocks the emission of waveforms from generator GF, with the result that the signal present on wire 20 passes to wire 21 without any alteration.

This situation continues up to the end of interval $n_1T$, i.e. till the instant when the second pulse appears on wire 6 (dashed in FIG. 6) to zeroize the counter CC1 (FIG. 1).

The message to be now superimposed upon the main signal stream pertains to intervals $n_2T$, $n_3T$, $n_4T$ (FIG. 3a) of the supplementary stream.

At the end of interval $n_1T$, signal 5 goes from "1" to "0" and switches the input of selector SE1 (FIG. 1) from connection 11, originating at register R1, to connection 14, 15, linked to memory M2 with possible interposition of coder C2.

In this way, the supplementary message bits are supplied by source SS, linked to memory M2 through connection 13.

Source SS is triggered into emitting a new bit configuration on connection 13 by each pulse it receives from counter CL1 over wire 2; these bit configurations are temporarily stored in memory M2.

Memory M2 emits, on connection 14, a new bit configuration (which may be arranged differently, as will be seen, from the previously stored configurations) in response to each pulse it receives from counter CL1 through wire 3.

In the event the number of bits of the supplementary signal stream to be transmitted during each subframe interval differs from one interval to another, the read-only memory M1 is activated and, according to the binary configuration it receives from counter CL1 over connection 4, reads out on connection 12, to units C2 and M2, a signal which indicates the number of bits expected for each interval.

As a consequence of the latter signal, memory M2 organizes the quantity of bits which it has to emit during each interval; if that number is less than the number of bits stored, memory M2 will emit the required number of bits, keeping the remaining ones for the subsequent subframe interval. It is, of course, understood that within a frame period the entire quantity of bits stored is equal to the quantity emitted.

Coder C2 obviously has to learn from memory M1, through link 12, the quantity of bits handled in each interval, so as to be in position to carry out the correct coding operation.

In the particular example given, as will be recalled, the number of bits reserved for each of the three intervals $n_2T$, $n_3T$, $n_4T$ is equal to 10; hence, the intervention of memory M1 is not required here. Coder C2 may, however, be employed if, for the reasons set forth above, a coding of the information bits should be needed.

In FIG. 4 it has been assumed that, during interval $n_2T$, the following supplementary bit series is to be transmitted: 1001110101.

The procedures for modulating the modulable waveforms with the waveforms corresponding to the supplementary message bits are perfectly analogous to those described with reference to FIG. 6 for the bits of the frame-alignment word, though of course there will be differences in the pulse positions of signal 9 and therefore in the waveform of signal 17. The resulting waveforms of signals 19, 20 and 21 are also shown in FIG. 4.

I shall now describe the operation of the receiving section of FIG. 2 with reference to FIGS. 3b, 5, 7, 8, under the assumption that the signal present on wire 21 (FIG. 1) of the transmitting section is the one received over wire 22.

The reception of the frame-alignment word shown in FIG. 7 will be considered first.

The waveform of the incoming signal on receiving channel 22 carries the information relating to the time position of the frame associated with the main stream.

For the moment, the receiving section has been assumed to be already in condition of normal frame alignment, i.e. in a steady-state condition, and the assumption is also made that the alignment word, during this particular reception phase, is employed only for checking and confirming the condition of normal alignment; it will be shown later how the receiving section has to act in order to detect the condition of disalignment and to establish the steady state.

Circuit RS2 (FIG. 2) derives from the signal present on wire 22 the timing signal, having a pulse cadence equal to the recurrence period of the mainstream symbols, and sends it over wire 23 to circuit CD and counter CL2.

According to the assumption made above, counter CL2, being stepped by the signal present on wire 23, sends over wire 27 a first pulse, shown by a dashed line on the homonymous row of FIG. 3b, which through gate P7 (FIG. 2) reaches flip-flop F2 and causes the energization of its output lead 39 with a signal of logical value "1".

The pulse present on wire 27 is also used by memory M5 as a storage order for the supplementary message fed to it from memory M3.

The high signal generated by flip-flop F2 on wire 39 is transmitted to logic circuit LA and unblocks the gate P4.

In response to the timing signal present on wire 23, and with a slight delay relative to the pulse present on wire 27, counter CL2 sends over wire 30 a logical "1" which will remain unchanged till the end of interval $n_1T$ (FIGS. 3b, 7); this marks the time period assigned to the frame-alignment word. The high pulse present on wire 30 (FIG. 2) is sent to logic network LA and unblocks the gate P2.

Because of the assumption made before, logic network LA is initially in condition 1a (FIG. 8). Since it now receives a logical "1" on wire 30 as well as on wire 39, and since the signal on wire 42 is immaterial, network LA turns to condition 2a in conformity with the transition arrow labeled 11X; this change corresponds to the start of interval $n_1T$.

Circuit CD (FIG. 2), in response to the timing signal it receives from clock-pulse extractor RS2 and to the signal it detects on wire 22, recognizes the modulable waveforms and emits on wire 24 a confirmation pulse coinciding with each modulable waveform just recognized; in addition, threshold circuit CD energizes the wire 25 upon detecting any modulable waveform modified by modulation with a logical "1", as has been shown in FIG. 7 on rows 24, 25.

The first pulse present on wire 24 (FIGS. 2, 7) causes the shifting of a bit in register R3 and the consequent loading into its first storage cell of the logical level present at the input linked to wire 25 (in this particular case a logical "1" constituting a demodulation pulse). The pulse on wire 24 arrives also at counter CC2 but is here ineffectual since it has been assumed, as indicated on row 35 of FIG. 7, that unit CC2 should already have reached its maximum count which is considered, in this example, equal to 10.

The first confirmation pulse present on wire 24 further reaches register R2 through gate P1, which is unblocked by the concurrent demodulation pulse on wire 25, via wire 18, gate P4 (already unblocked by the signal present on wire 39) and wire 40; this first confirmation pulse causes in register R2 a one-position shift of the stored bit configurations toward its output and the consequent entry of the bit configuration present at its input, which is linked to counter CL2 by connection 29; the latter configuration corresponds, in the chosen example, to numerical value "2", as shown in FIG. 7.

The demodulation pulse present on wire 25 (FIG. 2) reaches also the memory M3, but is not stored therein since in this phase the memory M3 is not addressed by the signal present on connection 35; this is due to the fact that, as already said, the value 10 read out on connection 35 by counter CC2 does not correspond to any address in memory M3 whose cells are here considered identified by addresses 0–9.

The second confirmation pulse 24 (FIG. 7) acts in the same manner as the first one, except that it causes the loading into register R3 (FIG. 2) of a logical "0" since upon the occurrence of this second pulse there is no demodulation pulse present on wire 25.

The third confirmation pulse present on wire 24, being again associated with a "0" bit, will behave in exactly the same way as the second one.

The fourth confirmation pulse appearing on wire 24, coinciding with numerical value "8" present on connection 29, is also coincident with the second demodulation pulse present on wire 25 as it coincides with the reception of a bit "1" of the supplementary signal stream.

Since in the fixed part of the alignment word, according to the example described here, two bits "1" are present, register R2 consists of only two storage positions; therefore the second demodulation pulse on wire 25 causes a shifting of the stored numerical value "2" toward the output connection 41 and the simultaneous loading of the value "8" present at the input connection 29.

The fourth confirmation pulse present on wire 24 causes in register R3 a one-position shift of the stored bits and the consequent entry of the logical "1" present on wire 25; therefore at the output connection 31 of register R3 the bit configuration 1001 is present, which corresponds to the fixed part of the alignment word.

Circuit CF1 recognizes this configuration and emits over wire 32 a verification pulse which, via AND gate P2 (already unblocked), wire 33, OR gate P3 and wire 34, arrives at counter CC2 and memory M3 as a resetting signal for both; the same verification pulse 32 resets the flip-flop F2 so as to change its output signal, present on wire 39, from logical "1" to logical "0" as has been shown on row 39 of FIG. 7.

The low signal now present on wire 39 (FIG. 2) reblocks the gate P4 and is conveyed to logic network LA.

At this point network LA receives a logical "1" from wire 30 and a logical "0" from wire 39, thus changing from state $2a$ (FIG. 8) to state $3a$ regardless of the state of energization of wire 42.

Hence, state $3a$ means that the fixed part of the alignment word has been correctly received and that the reception of the variable part is awaited.

The fifth confirmation pulse 24 (FIG. 7) increases the reading of counter CC2 (FIG. 2) by one unit, changing it from "0" to "1"; since on wire 25 in coincidence with this fifth pulse a logical "0" is present, a logical "0" will be stored in the first cell of memory M3 identified by the address "0".

The fifth confirmation pulse present on wire 24 also reaches register R3, causing a shifting of its contents toward the output and the consequent loading of a "0" into its first cell; the resulting bit configuration, which appears on connection 31 at the output of register R3, does not correspond to any predetermined configuration and therefore remains unutilized.

With subsequent confirmation pulses 24, till the end of interval $n_1T$ which is marked by a high/low change of the signal present on wire 30, register R3 will behave in the same way as in the case of the fifth confirmation pulse. Furthermore, the sixth confirmation pulse 24 causes the stepping up by one unit of the counter CC2, bringing it to a count of "2"; in this case, with a demodulation pulse present on wire 25, a logical "1" will be stored in the cell of memory M3 which corresponds to address "1".

At the output of memory M3, on connection 36, there is now the 10-bit configuration 0100000000, which is equivalent in binary code to the decimal number "2"; the first 6 bits of this binary configuration arrive through the optional decoder C4 (which is present only if at the transmitting-end coder C1, FIG. 1, has been used) and the connection 38 at comparator CF2, which simultaneously receives on its other input, linked to connection 41, an identical binary configuration coming from register R2.

In view of the identity of the two configurations, comparator CF2 emits a logical "1" over wire 42 to logic network LA, now in state $3a$ (FIG. 8). As long as there is a high signal on wire 30 and a low signal on wire 39, network LA receives configuration 101 (which is obviously included in configuration 10X) and remains at the state $3a$, as shown in FIG. 8.

Each subsequent confirmation pulse 24, from the 7th through the 10th, steps the counter CC2 by one unit and enters a logical "0" in the cells of memory M3 that are respectively addressed by these pulses, in the manner discussed above.

With the 10th pulse 24, counter CC2 will have reached the value "6" which is read out on connection 35 to memory M3 and pulse generator GP2.

It should be pointed out that also the previous readings of counter CC2 were transmitted on wire 35 to generator GP2 but remained ineffectual since they had a value less than 6, i.e. less than the number of bits of the variable part of the alignment word.

Having received from connection 35 a binary configuration of numerical value "6", generator GP2 sends over wire 37 a pulse which is delayed by line L2 and subsequently conveyed over wire 44 to gates P5 and P7. At the AND gate P5, the pulse on wire 44 is now ineffectual since by this time gate P5 is blocked by the low signal present at its second input linked to wire 45; the pulse present on wire 44 is, however, transmitted, via OR gate P7 and wire 49, to flip-flop F2 which thereupon produces a logical "1" on its output connected to wire 39.

Logical value "1" on wire 39 unblocks the gate P4 and also reaches logic network LA, causing therein a switchover from state $3a$ (FIG. 8) to state $4a$, according to the arrow marked by configuration 111.

State $4a$ of network LA means that the whole alignment word has by now been received, and that the alignment condition is confirmed.

This situation remains unchanged till the end of interval $n_1T$, since a transition from state $4a$ to state $1a$ may take place only when network LA receives from wire 30 a logical "0" which corresponds to the end of interval $n_1T$.

Interval $n_2T$, which immediately follows, carries a supplementary message which is extracted with the procedure described hereinafter. During this phase only the following blocks of FIG. 2 go into action: RS2, CD, CL2, P3, CC2, M3, M4, C3, M5.

The blocks RS2, CD, CL2 operate in the manner already dealt with during interval $n_1T$.

The first pulse present on wire 26 (FIG. 3b) is transferred through OR gate P3 (FIG. 2) and wire 34 to counter CC2 and memory M3, thus causing the resetting of both.

The next confirmation pulse (i.e. the first pulse 24 shown in full lines in FIG. 5) steps the counter CC2 (FIG. 2) by one counting unit and, since on wire 25 a demodulation pulse is concurrently present, a logical "1" is written into the first cell of memory M3 to which the address "0" corresponds.

In a similar way, each of the remaining pulses 24, through the 10th one, advances the reading of counter CC2 by one unit and causes the entry of the logical value present on wire 25 in the correspondingly addressed cells of memory M3.

Upon the occurrence of the 11th pulse 24, counter CC2 is at level 10 which corresponds to its highest count but does not correspond to any address of memory M3. Thus, subsequent confirmation pulses up to the end of interval $n_2T$ do not cause any variation in the setting of counter CC2 and there occurs, consequently, no further writing into memory M3.

The second pulse on wire 27, indicated on the homonymous row of FIG. 3b as the first pulse shown in full lines, causes the loading into memory M5 of the binary configuration present at its input linked to memory M3, through connection 36 and decoder C3, if present.

The emission of the bits stored in memory M5 on its output 50 occurs during the subsequent interval $n_3T$ in coincidence with the 3rd pulse present on wire 28 (second full-line pulse 28 in FIG. 3b); it will be apparent that the first full-line pulse 28 is used for the readout of the bits previously stored, relating to the last interval of the previous frame.

What has been said about interval $n_2T$ holds obviously true for the remaining subframe intervals $n_3T$, $n_4T$.

As already pointed out, in the steady state, in the presence of established frame alignment and in any subframe interval not allotted to the alignment word, logic network LA is in state 1a (FIG. 8). At the beginning of the interval assigned to the alignment word, as described above, network LA (FIG. 2) changes over to state 2a, which corresponds to the waiting phase for the fixed part of the alignment word, according to the transition arrow labeled 11X.

If that fixed part is correctly received and then recognized by circuit CF1 (with resulting switchover to a logical "0" on wire 39) before the end of interval $n_1T$ assigned to the alignment word (during which a logical "1" is present on wire 30), network LA changes into state 3a according to the transition arrow marked by 10X (FIG. 8).

If, however, this identification does not occur for the whole duration of interval $n_1T$, state 2a is kept unaltered according to arrow 11X; at the end of that interval, characterized by the change from "1" to "0" of the signal on wire 30 (FIG. 2), the nonoccurrence of that identification causes a switchover to state $1f_1$ along the path of arrow OXX.

State $1f_1$ may also be attained from state 3a, corresponding to the wait for the variable part of the alignment word, pursuant to arrow 01X in the case where, upon reception of all the bits of the variable part of the alignment word, that variable part has not been recognized as correct.

State $1f_1$ means that one of the intervals subsequent to subframe $n_1T$ has been reached, and that in the interval $n_1T$ the alignment has not been confirmed.

State $1f_1$ is maintained till the beginning of interval $n_1'T$ (FIGS. 3a and 3b) allotted to the alignment word of the subsequent frame of the supplementary signal stream.

Changes within the triangle defined by states $1f_1$, $2f_1$, $3f_1$ (FIG. 8) take place with the same modalities as have been discussed for the transitions which occur within the triangle defined by states 1a, 2a, 3a, as indicated by transition arrows carrying the same labels.

From triangle $1f_1$, $2f_1$, $3f_1$ the path leads to state 4a along the transition arrow marked 111, in the case where during interval $n_1'T$ the alignment word has been identified; otherwise there is a transition to an adjoining triangle (not shown in FIG. 8) defined by states $1f_2$, $2f_2$, $3f_2$.

Analogously, network LA may pass from the latter triangle to state 4a in the case in which during a nonillustrated interval $n_1''T$, which follows upon interval $n_1'T$, the alignment word has been identified; otherwise a third triangle is reached, and so on up to a predetermined number $\alpha$ of successive times in which the alignment word has not been identified, i.e. up to the triangle defined by states $1f_\alpha$, $2f_\alpha$, $3f_\alpha$.

From this last triangle, it is possible to switch to state 4a, in a way similar to the previous cases, or to state 1r, which establishes the condition "alignment search".

In state 1r of logic network LA (FIG. 2) the receiver is out of step. Thus, the logic network seeks to establish the requisite alignment, using for guidance the only element which must exist somewhere in the incoming signal, namely the fixed part of the alignment word; network LA now allows the receiver to recognize this fixed part anywhere within the arriving signal stream, regardless of the position of counter CL2.

In particular, network LA sends a logical "1" over wire 45 to unblock the AND gates P5 and P6; gate P4 is unblocked by a logical "1" present on wire 39, at the output of flip-flop F2, as a result of the fact that after each verification pulse on wire 32, resetting the flip-flop F2, at least one setting pulse for this flip-flop will necessarily arrive on wire 49 through OR gate P7, either from wire 27 or from wire 44, as described above.

In this situation, circuits CC2, P3, P2, R3, CF1, GP2, L2, P7, F2, P1, P4, R2, C4, M3 operate in the manner already examined in the preceding description of the operation in steady state, i.e. in a condition of normal alignment. Now, the confirmation pulses coinciding with demodulation pulses 25 pass via gate P1, wire 18, gate P4, wire 40, gate P6 and wire 47 to counter CL2 as resetting signals.

As a consequence of the resetting of counter CL2, a logical "1" is present on wire 30, directing logic network LA to change from state 1r (FIG. 8) to state 2r in conformity with the transition arrow labeled 11X.

Immediately before each resetting of counter CL2 (FIG. 2) a bit configuration is present on connection 29 indicating the number of symbols of the main signal stream which have appeared since reception of the last bit "1" of the supplementary signal stream.

These configurations are written into the cells of register R2, each in response to the reception of a subsequent supplementary bit "1", and are progressively shifted toward the output connection 41, up to the moment when comparator CF1 recognizes the fixed part of the alignment word.

Logic network LA is maintained in state 2r (FIG. 8), as indicated by the looped arrow labeled 11X, as long as a logical "1" is present on wire 30 and the signal present on wire 39 remains high.

If no demodulation pulse 25 appears within a time interval equal to the duration $n_1T$, starting from the instant when logic network LA has attained state 2r, which also rules out the possibility that within the received signal stream the fixed part of the alignment word (1001) is recognized, logic network LA goes back from state 2r to state 1r along arrow OXX, since the signal on wire 30 changes from logical "1" to "0".

The change from state 2r to state 3r, according to the transition arrow labeled 10X, is accomplished when the fixed part of the alignment word is recognized by comparator CF1 (FIG. 2); the comparator then resets the flip-flop F2 by a verification pulse 32 to produce a logical "0" on wire 39.

The low signal on wire 39 reblocks the gate P4, which insulates the wire 40 to prevent any further resetting of counter CL2, the leading of new binary configurations into register R2 and, consequently, the shifting of the bit combinations previously stored therein.

Return from state 3r (FIG. 8) to state 1r is possible along arrow OXX, in the event of nonreception of at least six supplementary bits before a time interval equal to $n_1T$ has elapsed, starting from the instant when the last resetting of counter CL2 has occurred (FIG. 2).

In state 3r (FIG. 8) the first six supplementary bits received are stored in the first six cells of memory M3 (FIG. 2); as already said, these bits correspond to the variable part of the alignment word and indicate the number of mainstream symbols transmitted between the beginning of the supplementary frame and the first mainstream symbol of the main information corresponding to a modulable waveform, which in this case is modulated in order to convey the first bit "1" of the fixed part of the alignment word.

Upon storage in memory M3 of the 6th of these bits, generator GP2 sends a pulse on wire 37 to delay line L2.

Via connection 36, decoder C4 (if present) and connection 39, the configuration of the six bits stored in memory M3 is transferred to adder AD, which receives from register R2 through connection 48 the binary configurations stored in the previous state 2r; the sum of these configurations corresponds to the number of mainstream symbols sent between the first and the last bit "1" of the fixed part of the alignment word.

Adder AD sums up the numbers represented by the configurations present on connections 48 and 38 and sends the result to counter CL2, through connection 43. This sum indicates the number of mainstream symbols sent between the beginning of the supplementary frame and the last resetting of counter CL2.

The pulse generated by generator GP2 on wire 37 is transferred to wire 44 with a delay determined by line L2, so as to allow adder AD to correctly perform the summing operation.

This pulse reaches, via gate P5 and wire 46, the counter CL2 and causes a preloading thereof with a count equal to the value of the number represented by the binary configuration present on connection 43.

In this way the counter CL2 is adjusted to the actual start of the frame of the supplementary signal stream and is thus synchronized with counter CL1 (FIG. 1) of the transmitting section.

From the output of line L2 (FIG. 2) on wire 44, the delayed pulse just examined arrives, via gate P7 and wire 49, at flip-flop F2 to set it so as to produce on wire 39 a signal of logical value "1".

As a consequence of all that, logic network LA changes from state 3r (FIG. 8) to state 4r, pursuant to the transition arrow labeled 11X.

State 4r corresponds to the situation in which, still within time interval $n_1T$, the search phase for the alignment word may be considered terminated.

At the end of interval $n_1T$ the signal present on wire 30 (FIG. 2) changes from logical "1" to "0"; as a result, logic network LA changes from state 4r (FIG. 8) to state $1p_1$.

Changes within the triangle defined by states $1p_1$, $2p_1$, $3p_1$ take place with the same procedure as already examined for changes occurring within the triangle defined by states 1a, 2a, 3a, as indicated by transition arrows marked with the same notations.

The only differences lie in the fact that the possible exits are now either to state 1r or to state $4p_1$.

Reversions to state 1r take place in the case where the alignment is not confirmed within the interval allotted to the alignment word. Thus, for instance, if the system is in state $2p_1$, i.e. if it is waiting for the reception of the fixed part of the alignment word, and the corresponding interval ends before the identification occurs, the change to state 1r will be performed along arrow OXX; if the system is in state $3p_1$, i.e. if it is waiting for the reception of the variable part of the alignment word, and the corresponding interval ends after all six bits of this variable part have been received but the alignment is not confirmed, because of some deviation from the bits expected according to the contents of register R2, the change from state $3p_1$ to state 1r will be accomplished along arrow 01X.

The change from the same state $3p_1$ to state $4p_1$ is made, according to arrow 111, when, within the interval envisaged for the alignment and upon reception of all six bits of the variable part of the alignment word, an acknowledgment of the alignment is presumed.

If for some reasons, at the end of the alignment interval, the number of bits received is less than six, there will be a change to state $1p_1$ according to arrow OOX.

From state $4p_1$ a change will lead to state $1p_2$ forming part of a nonillustrated triangle defined by states $1p_2$, $2p_2$, $3p_2$ which may be left by changing from state $3p_2$ to state $4p_2$ (similar to state $4p_1$) and from there a further triangle of states $1p_3$, $2p_3$, $3p_3$ may be entered, and so on, up to the entry into the triangle defined by states $1p_\beta$, $2p_\beta$, $3p_\beta$.

The change from one triangle to the next one, through the intermediate states $4p_1 ... 4p_{(\beta-1)}$, always occurs in cases in which the alignment is confirmed; otherwise state 1r will be re-entered.

A series of $\beta$ triangles has been devised so that the system must obtain $\beta$ times the alignment acknowledgment before considering it as definitely true, with changeover to the steady condition characterized by state 4a.

In each of the states represented in the diagram of FIG. 8, logic network LA (FIG. 2) emits over wire 45 a "1", if it is in one of the alignment-search states 1r, 2r, 3r (FIG. 8), and a "0" in all the other states.

In the three cases in which network LA sends out a "1", it unblocks gates P5, P6, allowing the necessary resetting and incrementation of counter CL2 as described above.

Though I have particularly described a simple case in which the supplementary message is sent through a stream of binary symbols, my invention may be readily extended to a system having any number of different symbols, as will be obvious to persons skilled in the art.

I claim:

1. A method of conveying and recovering supplementary message signals superimposed upon a multilevel signal stream in a digital transmission system, comprising the steps of:

generating, at a transmitting end, a main signal stream consisting of waveforms occurring during consecutive clock cycles and carrying information in the form of amplitude variations among a plurality of levels including two limiting levels and at least one intermediate level;

monitoring said main signal stream to find modulable waveforms with amplitudes on at least one of said limiting levels;

converting supplementary message symbols into modification pulses coinciding with selected modulable waveforms;

modulating the selected modulable waveforms with respective modification pulses by extending the waveform amplitudes beyond their limiting level, thereby producing a composite signal stream to be transmitted to a receiving end;

detecting, at the receiving end, the modulated waveforms of said composite signal stream by comparing their amplitudes with at least one predetermined threshold; and reconstituting said supplementary message symbols from demodulation pulses derived from the detected modulated waveforms.

2. A method as defined in claim 1 wherein said main signal stream is organized in a recurrent frame divided into a plurality of subframes each encompassing a predetermined number of clock cycles, comprising the further steps of:

generating, at said transmitting end, a multibit alignment word;

modulating selected modulable waveforms in a first subframe of each frame with modification pulses derived from the bits of said alignment word to the exclusion of said supplementary message symbols;

recovering, at said receiving end, the alignment word from the modulated waveforms of said first subframe;

making a comparison between the recovered alignment word and a reference bit configuration; and inhibiting the reconstitution of said supplementary message symbols from demodulation pulses obtained in following subframes upon failure of said comparison.

3. A method as defined in claim 2 wherein said alignment word is divided into an invariable first part and a variable second part, said second part being based upon the number of clock cycles elapsed from the beginning of a frame to the occurrence of the first modulable waveform in the main signal stream, said reference bit configuration correspondingly consisting of a predetermined first part and a variable second part derived from the number of waveforms counted between the beginning of a frame and the appearance of the first modulable waveform in the composite signal stream.

4. In a digital transmission system adapted for conveying and recovering supplementary message signals superimposed upon a multilevel signal stream, in combination:

a transmitting section comprising an outgoing channel carrying a main signal stream consisting of waveforms occurring during consecutive clock cycles and containing information in the form of amplitude variations among a plurality of levels including two limiting levels and at least one intermediate level;

monitoring means connected to said outgoing channel for emitting marking pulses upon the occurrence of modulable waveforms with amplitudes on at least one of said limiting levels detected in said main signal stream;

a source of supplementary message symbols;

signal-generating means connected to said source and to said monitoring means for deriving modification pulses from said symbols in response to said marking pulses whereby said modification pulses coincide with said modulable waveforms;

analog adding means connected to said outgoing channel and to said signal-generating means for superimposing said modification pulses upon modulable waveforms coinciding therewith by modulating the coincident waveforms to extend their amplitudes beyond said limiting level, thereby producing a composite signal stream to be passed from said outgoing channel to a remote incoming channel;

a receiving section comprising threshold means connected to said incoming channel for detecting the amplitude excursions of modulated waveforms in said composite signal stream and emitting demodulation pulses upon the occurrence of said modulated waveforms; and output means in said receiving section connected to said threshold means for reconstituting said supplementary message symbols from said demodulation pulses.

5. The combination defined in claim 4 wherein said modulable waveforms have amplitudes at either of said limiting levels, said signal-generating means being provided with an input connected to said outgoing channel for ascertaining the limiting level corresponding to the amplitude of a detected modulable waveform and changing the polarity of a coincident modification pulse according to the limiting level ascertained.

6. The combination defined in claim 4, further comprising first counting means in said transmitting section connected to said outgoing channel for organizing said main signal stream into a recurrent frame divided into a plurality of subframes each encompassing a predetermined number of clock cycles, storage means for making available a multibit alignment word, selector means controlled by said first counting means for switching said signal-generating means from said source to said storage means during a first subframe of each frame to modulate coincident modulable waveforms with modification pulses derived from the bits of said alignment word, second counting means in said receiving section connected to said incoming channel for dividing said composite signal stream into corresponding frames and subframes, and verification means controlled by said second counting means for comparing a bit sequence recovered in a first subframe by said threshold means with a reference bit configuration and inhibiting the reconstitution of said supplementary message symbols by said output means during following subframes upon ascertaining a divergence therebetween.

7. The combination defined in claim 6 wherein said storage means contains an invariable first part of said alignment word and is jointly controlled by said monitoring means and said first counting means for registering a variable second part of said alignment word representing the number of clock cycles elapsed between the beginning of a frame and the first modulable waveform occurring in such frame, said transmitting section further comprising third counting means jointly controlled by said monitoring means and said first counting means for limiting the number of modification pulses produced by said signal-generating means during said first subframe to the total number of bits allocated to said alignment word; said receiving section further comprising fourth counting means jointly controlled by said second counting means and said threshold means for limiting the number of modulable waveforms detected during the first subframe of any frame to said total number of bits, said verification means including a register connected to said second counting means and controlled by said threshold means for storing the number of clock cycles arriving between the beginning of a frame and the first modulable waveform detected in said composite stream, first comparison means for matching a first part of a recovered bit sequence with a predetermined bit combination, and second comparison means controlled by said fourth counting means for matching the contents of said register with a second part of the recovered bit sequence immediately following said first part.

8. The combination defined in claim 7, further comprising a logic network in said receiving section with input connections to said first and second comparison means and with output connections to said second counting means for resetting the latter to restart a count of clock cycles in the absence of a match between said parts of an alignment word and bits recovered by said threshold means during an interval of predetermined duration.

9. The combination defined in claim 8 wherein said logic network is switchable by said first and second comparison means, upon lack of verification of an alignment word, into a succession of transitory states requiring a predetermined number of consecutive verifications prior to return to normal operation.

10. The combination defined in claim 9, further comprising a memory in said receiving section connected to said threshold means and controlled by said fourth counting means for storing a bit configuration recovered from said composite signal stream, corresponding to the second part of an alignment word, and logical summing means with inputs connected to said register and said memory for receiving the contents thereof and preloading said second counting means, under the control of said logic network and in a transitory state thereof, with a count corresponding to the sum of the numerical values of said contents.

* * * * *